US008898760B2

(12) United States Patent
Wheeler

(10) Patent No.: US 8,898,760 B2
(45) Date of Patent: Nov. 25, 2014

(54) AUTHENTICATING A TRANSACTION WHEN A CONNECTION TO A NETWORK BECOMES UNAVAILABLE

(75) Inventor: Geoffrey Charles Wyatt Scott Wheeler, Newbury (GB)

(73) Assignee: Vodafone IP Licensing Limited, Newbury, Berkshire ( * ) Notice: Subject to any disclaimer, the term of this patent is extended or adjusted under 35 U.S.C. 154(b) by 138 days.

(21) Appl. No.: 13/170,485

(22) Filed: Jun. 28, 2011

(65) Prior Publication Data

US 2012/0047563 A1    Feb. 23, 2012

(30) Foreign Application Priority Data

Jun. 28, 2010  (GB) .................................. 1010797.7

(51) Int. Cl.
| | |
|---|---|
| G06F 7/04 | (2006.01) |
| G06F 21/33 | (2013.01) |
| G06Q 20/38 | (2012.01) |
| H04L 9/08 | (2006.01) |
| H04L 9/32 | (2006.01) |
| H04W 12/06 | (2009.01) |
| G06Q 20/32 | (2012.01) |
| H04L 29/06 | (2006.01) |

(52) U.S. Cl.
CPC ............ *G06Q 20/385* (2013.01); *G06F 21/335* (2013.01); *H04L 9/0872* (2013.01); *H04L 9/3228* (2013.01); *H04W 12/06* (2013.01); *G06Q 20/3229* (2013.01); *H04L 9/3234* (2013.01); *H04L 2209/80* (2013.01); *H04L 63/0838* (2013.01)
USPC ................... 726/6; 726/9; 713/168; 713/184; 455/410

(58) Field of Classification Search
USPC .................... 726/6, 9; 713/168, 184; 455/410
See application file for complete search history.

(56) References Cited

U.S. PATENT DOCUMENTS

| | | | |
|---|---|---|---|
| 2005/0213511 A1* | 9/2005 | Reece et al. .................. | 370/252 |
| 2007/0058812 A1 | 3/2007 | Ali et al. | |

FOREIGN PATENT DOCUMENTS

| | | |
|---|---|---|
| WO | WO 2007/062787 A1 | 6/2007 |
| WO | WO 2010/000455 A1 | 1/2010 |

OTHER PUBLICATIONS

3GPP TS 23.048 V5.9.0 (Jun. 2005), Technical Specification, 3$^{rd}$ Generation Partnership Project; Technical Specification Group Core Network and Terminals; Security mechanisms for the (U)SIM application toolkit; Stage 2 (Release 5), 36 pp.

(Continued)

*Primary Examiner* — Thuong Nguyen
(74) *Attorney, Agent, or Firm* — Muirhead and Saturnelli, LLC

(57) ABSTRACT

An arrangement for authenticating a transaction between a user's mobile device and an entity such as a corporate server is disclosed. The user's universal integrated circuit card (UICC) is adapted to generate a time-dependent authentication code which is dependent on a time value and which is usable to authenticate the transaction only during a predetermined period. A time verification processor verifies a time value to ensure that the time-dependent authentication code was generated based on the correct time value. The time value is based on the UTC time obtained from UTC clock. The verified time is used to generate a "one-time" password (authentication code) by the authentication code calculator of the UICC. This is used to authenticate a transaction with the corporate network.

21 Claims, 7 Drawing Sheets

(56) References Cited

OTHER PUBLICATIONS

3GPP TS 23.236 V10.2.1 (Jan. 2011), Technical Specification, 3$^{rd}$ Generation Partnership Project; Technical Specification Group Services and System Aspects; Intra-domain connection of Radio Access Network (RAN) nodes to multiple Core Network (CN) nodes (Release 10), 39 pp.

* cited by examiner

AUTHENTICATING A TRANSACTION WHEN A CONNECTION TO A NETWORK BECOMES UNAVAILABLE

TECHNICAL FIELD

This application relates to apparatus for authenticating a transaction between a user and an entity. This application also relates to a method for authenticating a transaction between a user and an entity.

BACKGROUND TO THE INVENTION

Often transactions are authenticated between a user and an entity by the user providing that entity with a password or PIN which is in principle known only to the user and the entity. A problem with such authentication arrangements is that the password or PIN may become known to an unauthorised person, who may then be able to illegitimately perform transactions which appear to the entity to be requested by the user.

It is known to improve such authentication arrangements by using so-called "one-time" or "dynamic" passwords that are valid for only a predetermined time interval, typically one minute or less, or are used only once. With such an arrangement, even if the password or PIN is intercepted, the interception of the password or PIN will not facilitate illegitimate performance of transactions after the password or PIN has expired at the end of the predetermined time period.

One such known arrangement is RSA SecurID® authentication. With this system a user is provided with a "token", which may be a hardware or software component that is assigned to a particular user and which generates an authentication code using an algorithm at fixed time intervals (for example, every minute). Such tokens include a random key that is specific to the user (known as a "seed"), which random key is also known to a RSA SecurID server. The random key is typically 128 bits long. A hardware token typically includes an LCD display which displays the authentication code, which is generated using the random key, and that is valid for the current one minute time period.

If the token is a hardware token, it will typically include a tamper resistant built-in clock which is used to determine the time intervals at which a new authentication code should be calculated. If the token is a software token, then typically access to a time source will be provided in order to determine the time interval for calculating each new authentication code. The time may be provided by Network Time Protocol (NTP), for example.

When a user wishes to perform a transaction, such as accessing a remote server, to perform the authentication, the user provides a user ID, a password or PIN, and the authentication code displayed at the moment of login on the display of the securID token. The user ID and password or PIN are checked by the remote server and the authentication code is provided to the securID server for validation. The securID server includes its own real-time clock (which is effectively synchronised with the clock of the token) and a database of valid securID tokens and their random key/seed. The secure ID server uses the same algorithm as the secure ID token to compute what the authentication code should be at that moment in time, and then determines whether the authentication code that it has calculated corresponds with the authentication code provided by the secure ID token and transmitted via the remote server. If the authentication codes match, then the secure ID server indicates to the remote server that authentication has been completed satisfactorily. Access to the remote server is allowed if the user ID, password/PIN and the authentication code match the expected values.

Whilst a secure ID token provides a relatively secure arrangement for authenticating transactions, it does require the user to carry the authentication token with them at any time at which they may wish to perform a transaction. Some users find this inconvenient.

SUMMARY OF THE INVENTION

According to a first aspect of the system described herein, there is provided apparatus for authenticating a transaction between a user and an entity, the apparatus including a cellular telecommunications network Universal Integrated Circuit Card (UICC) module (commonly known as a subscriber identity module (SIM)) adapted to generate a time-dependent authentication code which is dependent on a time value and which is usable to authenticate the transaction only during a predetermined time period, the apparatus including a time value verifying device for verifying the time value, such as a time verification processor.

In the embodiments to be described by way of example below, a conventional UICC is modified so that it can generate a "one-time" or "dynamic" authentication code that is similar to the type used in RSA securID authentication, discussed above.

Many people carry with them always a mobile telecommunications device, which includes a UICC. By using this UICC to authenticate transactions, a highly convenient arrangement for authenticating transactions is provided which does not require the user to carry any separate special token. A UICC which the user already carries in the mobile device, for the conventional purpose of obtaining telecommunications services, is used to perform authentication of transactions.

The UICC may have access to a local clock, e.g. the clock on the mobile telecommunications device, e.g. a handset. A time indicator from this clock may not give the correct current time as it may be set to an incorrect time zone, or it may drift from the set time. The local clock may be relied on to increment its indicated time correctly to within a few seconds per day if the clock is not altered by some external event such as the user changing the indicated time.

The transaction to be authenticated may merely involve the exchange of information. For example, the user may simply need to be authenticated in order to download information from the third party. Such information may be information kept by the third party on behalf of the user (for example, information relating to the user's bank account). Instead, the information might be information held on a data network belonging to an organisation or commercial entity with which the user is connected or by whom the user is employed, thus facilitating access to that network by the user when the user is travelling. Another possible transaction may involve the downloading of software from the remote location. In addition, the transaction may require a payment to be made by the user in order to enable the transaction to take place, such as a payment to the third party in return for the information provided.

In the embodiments described the time-dependent authentication code is generated by an authentication code calculator. The authentication code calculator receives a message from a transaction manager application (which may be provided on the UICC module or may be provided on another part of the apparatus). The message includes a time value and other information which allows the time verification device to verify that the time value is accurate. The information may include an indication that the time value has very recently been obtained from a network connection by a reliable clock source. Alternatively, the information may include an indication that the time value has been evaluated and is considered to be likely to be an accurate estimation of the true current time.

The apparatus may include a device for obtaining the current time from a time source, which time obtaining device may cause generation of a message for requesting the current time value from the time source. This message may be in the form of a USSD message, an SMS message or a method sent in a packet switched or circuit switched communication system between a mobile telecommunications device and the cellular telecommunications network. The time value from the time source may be communicated back using one of the same mechanisms (e.g. USSD, SMS, or packet or circuit switched communication session).

When the time verification device provides an indication that the time is considered to be likely to be an accurate estimate of the current time, the time verifying device may compare the current time with a time indicator from a local clock that is accessible by the apparatus, the time verifying device calculating an offset value indicative of the difference between the current time and the time indicator, such that the time verifying device may use this offset to estimate the current time when only a time indicator from a local clock is available.

The time-dependent authentication code may be dependent upon a key value and the time value. The key value may be unique to the user of the UICC. The key value may be transmitted securely over the air to the UICC for storage on the UICC.

The UICC may be operable to be registered with a cellular telecommunications network for which the user has a mobile telecommunications device, the UICC including information which is usable to authenticate the user's mobile telecommunications device with the cellular telecommunications network to obtain telecommunications services therefrom, such as voice calls, data communication sessions, SMS transmission etc. The UICC may be operable to authenticate the user by a challenge and response mechanism in accordance with the GSM and UMTS Standards (for example), such that registration with the cellular telecommunications network is only possible after satisfactory authentication has been performed. In one embodiment of the system described herein, the apparatus will only generate the time-dependent authentication code when the UICC module is registered with the cellular telecommunications network. This provides enhanced security as, to perform the transaction, not only does the user have to be in possession of UICC module capable of generating the correct authentication code, but the UICC module must also be capable of authentication with the cellular telecommunications network and registration with the cellular telecommunications network.

BRIEF DESCRIPTION OF THE DRAWINGS

For a better understanding of the system described herein, embodiments will now be explained by way of example, with reference to the accompanying drawings, in which.

In the drawings like elements are generally designated with corresponding reference signs.

DETAILED DESCRIPTION OF VARIOUS EMBODIMENTS

Figure 1:
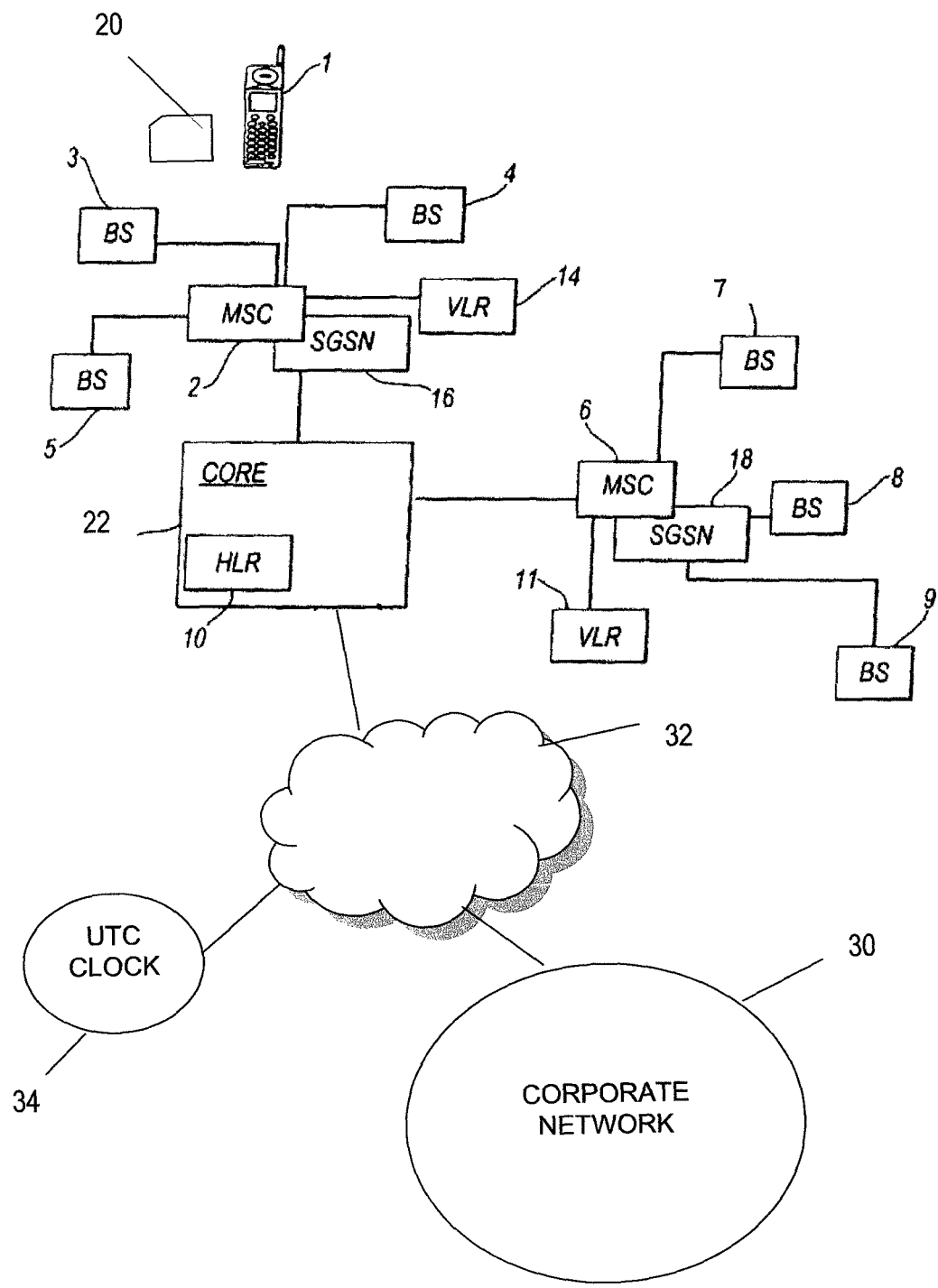
FIG. 1 is a diagrammatic drawing of certain elements of a network including a mobile telecommunications network, a corporate network and a UTC clock that may be used in connection with an embodiment of the system described herein.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or UICC 20 which, when associated with the user's mobile terminal 1 identifies the subscriber to the network. The UICC card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated UICC card 20) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, which is incorporated herein by reference, the base station follows prescribed rules to select which MSC to use, and then transmits this IMSI to the selected MSC.

MSC 2 now accesses the appropriate storage location in the HLR 10 present in the core network 22 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 6 in the manner described above, the HLR 10 additionally performs an authentication procedure for the mobile terminal 1. The HLR 10 transmits authentication data to the MSC 2 in "challenge" and "response" forms. Using this data, MSC 6 passes a "challenge" to the mobile terminal 1 through base station 7. Upon receipt of this data, the mobile terminal 1 passes this data to its UICC and produces a "response". This response is generated using an encryption algorithm on the UICC and a unique key Ki on the UICC. The response is transmitted back to the MSC 6 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 6 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required. This authentication process confirms the identity of the user to the network, so the user can be charged for telecommunications services.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the system described herein may be implemented.

From the description above, it will be understood that the coverage area of a mobile telecommunications network is divided into a plurality of cells, each of which is served by a respective base station.

Mobile networks such as 2G (GSM) or 3G (UMTS) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Calculations to determine whether to perform a handover from one base station to another base station are performed by the network, whereas calculations whether to perform cell reselection are performed by the mobile terminal.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network (that is, cell reselection has been performed), the precise cell in which the mobile terminal is located may not be known. It will therefore be necessary to perform paging in a number of cells. The greater the number of cells in which paging must occur, the more use of valuable signalling capacity within the network.

However, if the HLR/HSS 10 is to always have an up-to-date record of the cell in which each mobile terminal is located so that the current cell which is occupied by a terminal is always known, this will require a large amount of location updating signalling between the mobile terminal and the HLR/HSS 10 in order that the HLR/HSS 10 has up-to-date records of the cells occupied by each mobile terminal. This is also wasteful of valuable signalling capacity.

As indicated above, the HLR/HSS 10 is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

To deliver paging efficiently, in a known manner in 2G and 3G networks, the coverage area of the mobile telecommunications network is divided into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its UICC. This information stored on the UICC is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routeing area relates to a particular geographical area for communications in the packet-switched domain. Typically, although not necessarily, a routeing area is larger than the area of a single cell but is smaller than the area covered by one SGSN. A routeing area is typically, although not necessarily, smaller than a location area. There may be many routeing areas within one location area. Each cell within the network broadcasts data indicative of its routeing area (RAI) in addition to the data mentioned above indicative of the identity of its location area. The mobile terminal uses this received data to determine when it has moved to a new routeing area. The terminal stores the last known routeing area on its UICC. The information stored on the UICC is compared with the routeing area information broadcast by the local cell. The identities of the two routeing areas are compared. If they are different, the mobile terminal determines that it has entered a new routeing area. The mobile terminal then gains access to a radio channel and requests a routeing area update (RAU). The routeing area is updated in the same manner as the location area, as discussed above.

In addition to a cellular telecommunications network, FIG. 1 also shows a corporate network 30, which may, for example, be a network administered by a company that is the employer of the user of mobile device 1. The user of the mobile device 1 may connect the corporate network 30 via the internet 32. The current, accurate time may be provided via the internet 32 by a UTC (coordinated universal time) clock 34. UTC is a time standard based on International Atomic Time. UTC is the same irrespective of geographical location. Time zones around the world are typically expressed as positive or negative offsets with respect to UTC.

Figure 2:
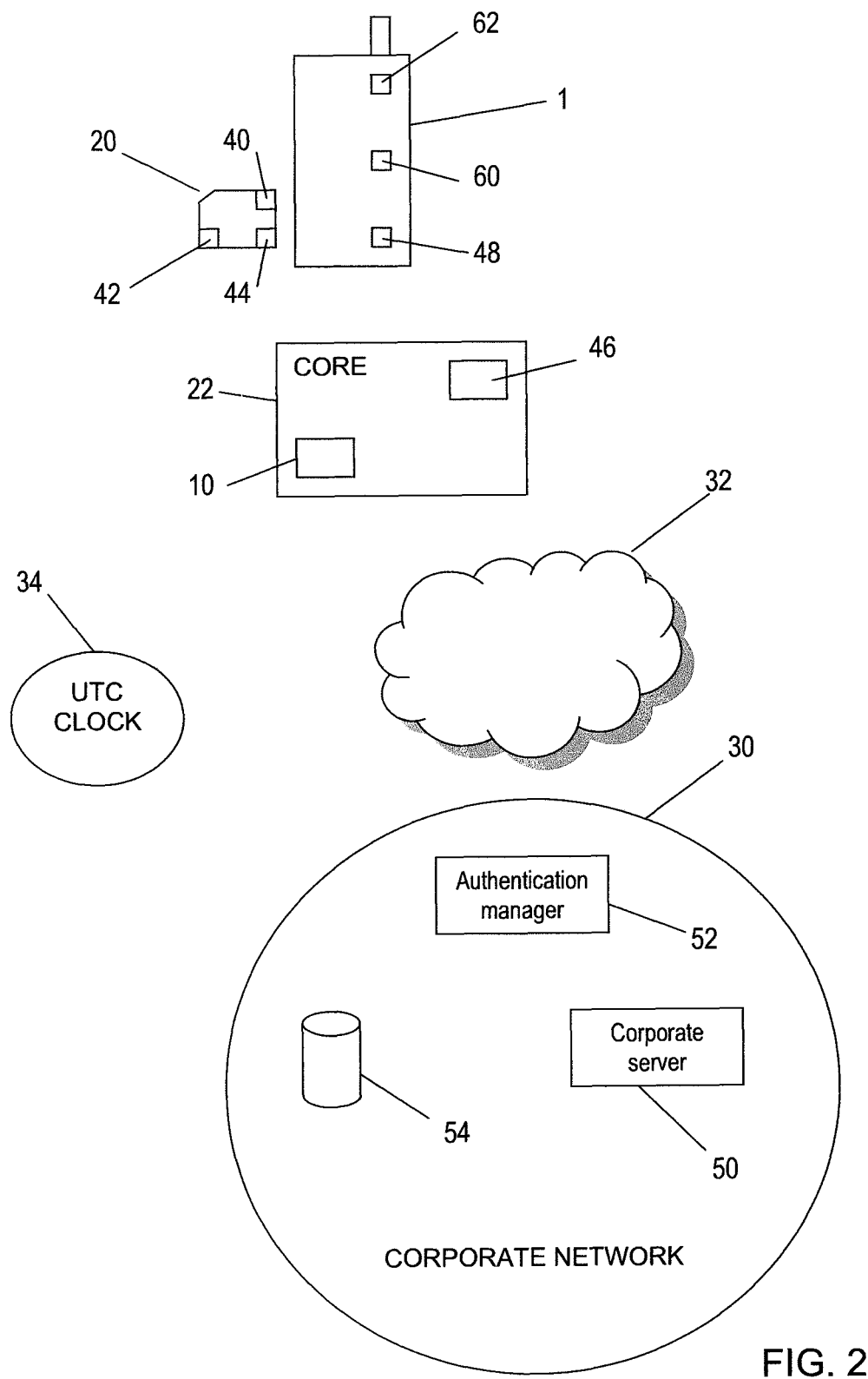
FIG. 2 is a diagrammatic drawing showing in more detail some of the elements shown in FIG. 1.

Embodiments of the system described herein will now be described in detail referring, initially, to FIG. 2, which shows in more detail some of the elements illustrated in FIG. 1.

According to an important feature of the embodiments, a conventional UICC 20 is modified so that it can generate "one-time" or "dynamic" passwords, for example similar to the type used in RSA securID authentication, discussed above.

The UICC 20 of the embodiments is modified to include a store 40 which stores a random key or "seed" that is allocated to the particular user of that UICC 20. The seed may be provided to the store 40 before the UICC is distributed to the user. Alternatively, the seed may be pushed securely to the UICC 20 from the core 22, whereafter it is stored in the store 40. This secure push may take place wirelessly over the cellular telecommunications network via the mobile device 1. The secure push may alternatively take place using a smart card reader attached to a computer. The security of the push of the seed is maintained by a cryptographic device defined in GSMA and 3GPP documentation of SIM and USIM over the air provisioning, including document 3GPP TS 23.048, which is incorporated herein by reference. The seed may be transmitted on a packed switched communication session following authentication of the SIM with the network core 22 in the manner described above.

The modified UICC 20 further includes a time verification processor 42 that is operable to provide a verified current time that corresponds to UTC. The manner in which the verified time is provided will be described further below. However, the purpose of the time verification processor 42 is broadly similar to the purpose of the tamper resistant built-in clock provided in a conventional secure ID token. The time verification processor can be implemented in hardware or software.

The modified UICC 20 further includes an authentication code calculator 44 which is operable to calculate an authentication code, that is dependent from the time obtained from the time verification processor 42 and on the seed obtained from the seed store 40. The authentication code will therefore change each time the time provided by the time verification processor 42 changes (in a similar manner to which the authentication code changes on an RSA securID token).

The mobile device 1 may include a Network Identity and Time Zone (NITZ) receiver 46 which receives the local time and date at the geographical location of the network, as well as the identity of the network provider. The mobile device 1 includes a NITZ store 48 for storing the current value of the time provided by the NITZ receiver 46 from the network core 22. The provision of the NITZ time is discussed in the GSM/UMTS Standards. As will be known to those skilled in the art, NITZ time provided by the network core 22 (and received by the NITZ receiver 46) is accurate only to the nearest minute. When a mobile device, such as mobile device 1, moves between networks in different time zones the NITZ time stored in the store 48 will be changed due to a different NITZ time value being received by the NITZ receiver 46 from the network core 22.

Although the NITZ time is useful to subscribers of mobile telecommunications networks, because it provides them with the time in their current time zone to the nearest minute, NITZ time is not appropriate to be used as a basis for calculating an authentication code.

Turning now to the corporate network 30, this includes a corporate server 50 which, in this embodiment, includes data that the user of mobile terminal 1 wishes to access (access to the data being the "transaction"). The corporate network 30 further includes an authentication manager 52. The authentication manager 52 operates in a similar manner to the securID server mentioned above. The authentication manager 52 performs an algorithm which corresponds to the algorithm used in the UICC 20 to calculate the authentication code. The authentication manager 52 has for each user of the corporate network 30 details of their user ID, PIN and the seed stored on the seed store 40 of the user's UICC 20. The user ID, PIN and seed for each user may be stored on database 54 which is accessible by the authentication manager 52. The authentication manager 52 is able to obtain the UTC time from the UTC clock 34 via the interne 32. As the authentication manager 52 runs the same algorithm as the authentication code calculator 44 of the UICC 20, if that algorithm is provided with the same seed as stored in the seed store 40 of the UICC 20, and the time indication obtained from the UTC clock 34 corresponds to the time used in the time verification processor 42 of the UICC 20, the authentication code generated by the authentication manager 52 will correspond to the authentication code generated by the authentication code calculator 44 of the UICC 20. The time received by the authentication manager 52 from the UTC 34 clock will typically be accurate to within a second and is not affected by time zones. As indicated above, the NITZ time is not an appropriate basis for the UICC to calculate an authentication code because that authentication code is accurate only to within one minute and is affected by time zones. If the UICC is in a different time zone to UTC, then the authentication code generated by the UICC 20 will not match the authentication code generated by the authentication manager 52. Even if the UICC 20 is in the same time zone as UTC, the NITZ time could be up to fifty nine seconds slow or fast, so that the authentication code generated by the UICC 20 will not usually match the authentication code generated by the authentication manager 52.

From the preceding discussion it will be apparent to those skilled in the art that for authentication of the user of a UICC 20 to be performed by the authentication manager 52, it is important that the time value that is used as the basis to calculate the authentication code at the authentication code calculator 44 of the UICC and at the authentication code calculator of the authentication manager 52 are the same. If they are not the same, then the authentication codes will not match and authentication of the transaction will not be possible.

However, as discussed above, conventionally, cellular telecommunications networks do not provide a means for determining the time with sufficient accuracy. Also, conventionally the time provided by telecommunications networks varies in dependence upon the time zone, which is unsatisfactory for the purposes of performing authentication.

The flow chart of FIGS. 3,4 and 5 will now be discussed in detail in order to explain how a transaction between the user of mobile terminal 1 and the corporate network 30 may be authenticated in a manner which overcomes the difficulties of the inaccurate NITZ time.

Firstly, with reference to FIGS. 2 and 3, a procedure performed by a time manager application 60 running on the mobile terminal 1 for determining the current time will be described—this procedure being referred to as the "get time" procedure.

Typically the procedure will be initiated when the user of a mobile device 1 wishes to authenticate a transaction with a corporate network, such as obtaining information from the corporate server 50. A transaction manager application 62 running on a mobile device 1 or UICC 20 will receive a request for an authentication code (this is described in more detail below with reference to FIG. 5). The time manager 60 then generates a message which requests the current UTC time. This message may be of any suitable format but should include an indication that the UTC time is requested and may include sufficient information to identify the user 1, for example by including the IMSI from the UICC 20 associated with the mobile device 1. The message is transmitted wirelessly to the network core 22 at step 3A. The message may be sent by any suitable mechanism—for example as Unstructured Supplementary Service Data (USSD), Short Message Service (although this may be less satisfactory due to delays in message transmission) or a packet switched or circuit switched communication session.

The message is received and interpreted by the network core 22. In response to the message, the network core 22 obtains the time from the UTC clock 34 by accessing the UTC clock 34 via the interne 32. The obtained UTC time is returned by the network core 22 in a reply message to the mobile device 1 at step 3B. This time is referred to as time T1.

The time manager application 60 also records the time currently recorded in the NITZ store 48 of the mobile terminal 1 (this is the latest NITZ time from the network core 22, received by the NITZ receiver 46) at step 3C. This is referred to as time T2. The application further calculates the "offset" between T1 and T2 at step 3D. This is referred to as time To, and equals T1−T2. The offset time To is the difference between the UTC time and the NITZ time.

When the transaction manager is initiated, it registers with the mobile device 1 to be notified when certain events occur. These events should include: (A) the mobile device registering with the mobile telecommunications network; (B) the mobile device undergoing a location update in the mobile telecommunications network; (C) the clock on the mobile device being changed for any reason, including a notification from the mobile telecommunications network, and also including a manual change by the user. The flow chart of FIG. 4 shows the steps performed by the time manager application 60 to determine when the "get time" procedure should be performed. The flow of execution occurs when a notification corresponding to one of the above events is received by the transaction manager.

At step 4A it is determined whether the mobile device 1 has been power cycled. If the transaction manager has received a notification that the mobile device 1 has registered with a mobile telecommunications network, step 4B (to be described below) will be performed.

If the notification received by the transaction manager does not relate to the mobile device registering with a mobile telecommunications network, it is then determined at step 4C whether a notification of a location area update (LAU) has been performed. That is, in response to a location area update by the mobile terminal 1, step 4B is performed. As discussed above, a location area update is performed when the mobile device moves to a new location area (LA).

If a location area update has not been performed, then, at step 4D, it is determined whether the time zone of the time on the NITZ store 48 of the mobile terminal has changed (i.e. whether the mobile terminal 1 has moved between time zones, or there has been a change from summer time to winter time or vice versa). If the time zone has changed, then step 4B is performed. If the time zone has not changed, the procedure returns to step 4A.

The time zone or summer/winter time setting may be changed automatically following an indicator from the core network 22, or may be changed manually by the user.

In response to it being determined that the mobile device 1 has registered with a mobile telecommunications network (step 4A), that the mobile device 1 has performed a location area update (step 4C), or that the time zone of the NITZ store 48 has changed (step 4D), step 4B is performed, at which it is determined whether a wireless connection to the network core 22 is available. A wireless connection may not be available if the mobile device 1 is in an area where no radio coverage is available from base stations of the network. If no network connection is available, then the procedure returns to step 4A.

Figure 3:
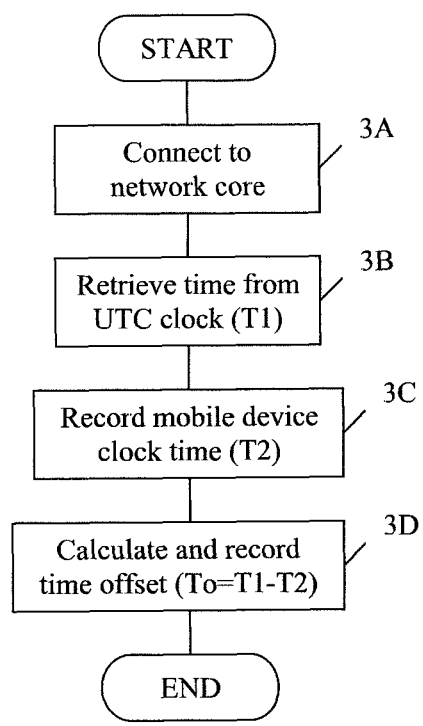
FIG. 3 is a flow chart showing the steps performed to obtain an indication of the current time, referred to as a "get time" procedure, according to an embodiment of the system described herein.
Figure 4:
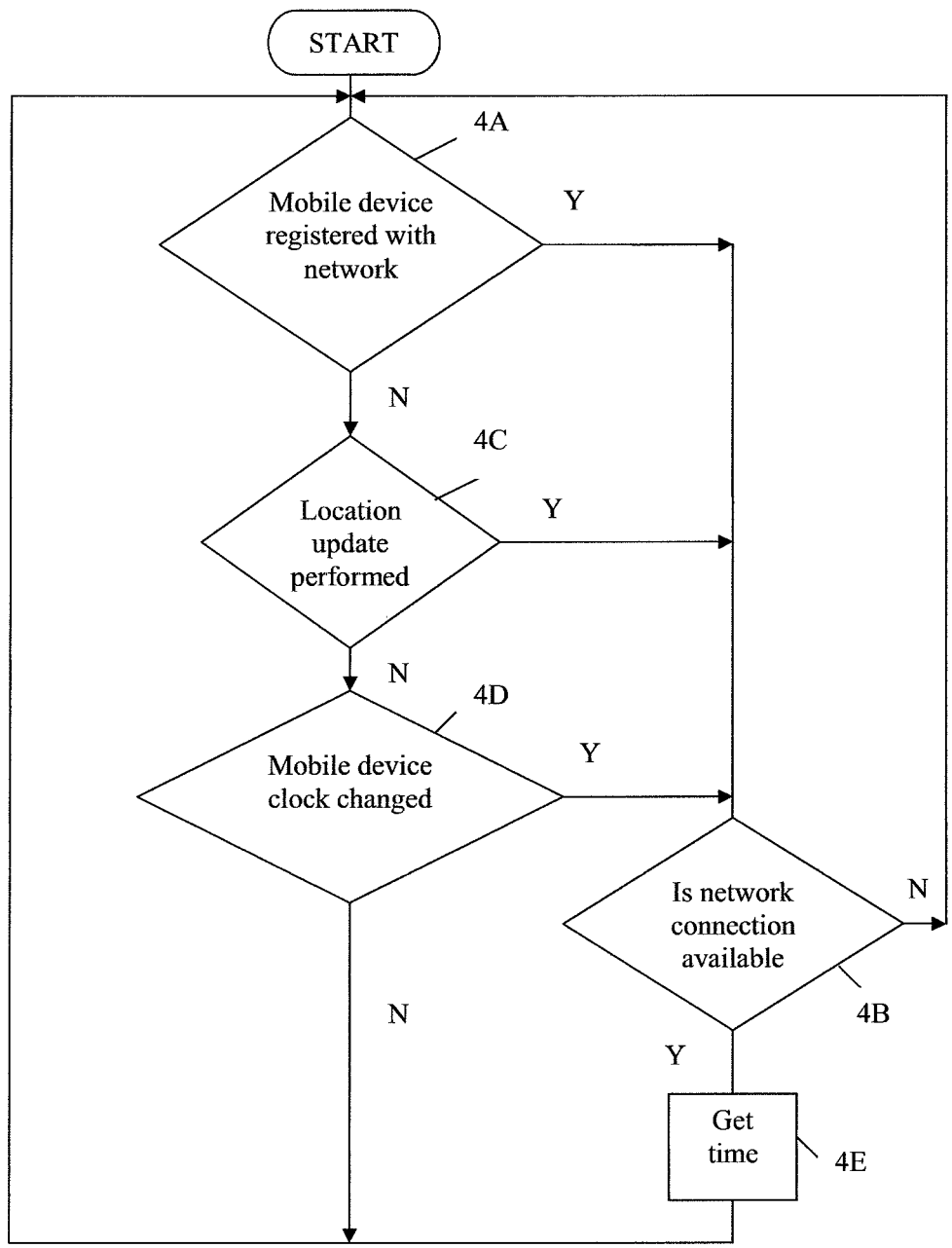
FIG. 4 is a flow chart showing the steps performed to determine when the current time should be obtained according to an embodiment of the system described herein.

On the other hand, if a network connection is available, at step 4E, the "get time" procedure of FIG. 3 is performed.

Figure 5A:
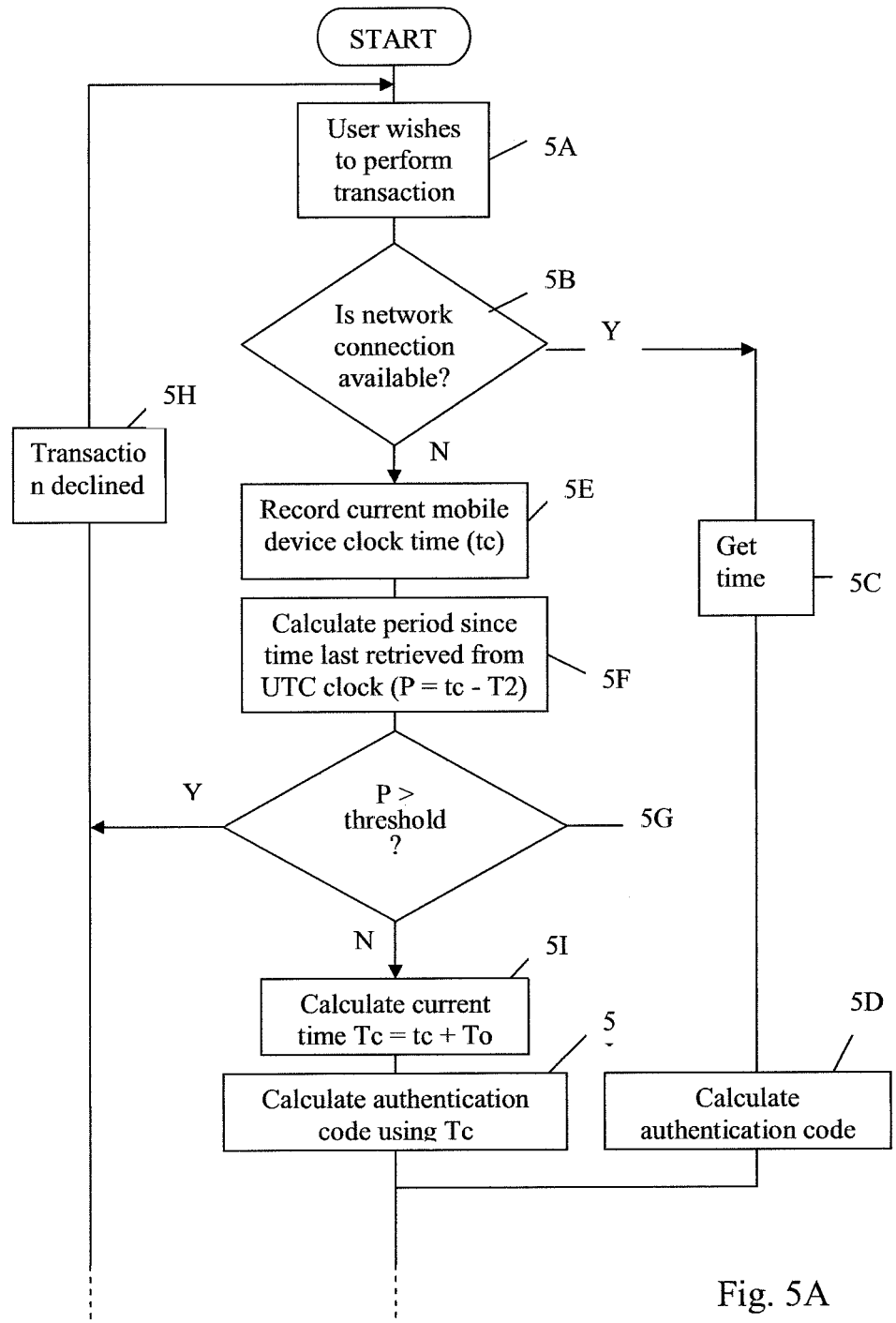
FIGS. 5A and 5B are a flow chart showing the steps taken to authenticate a transaction between a user and a corporate network entity according to an embodiment of the system described herein.
Figure 5B:
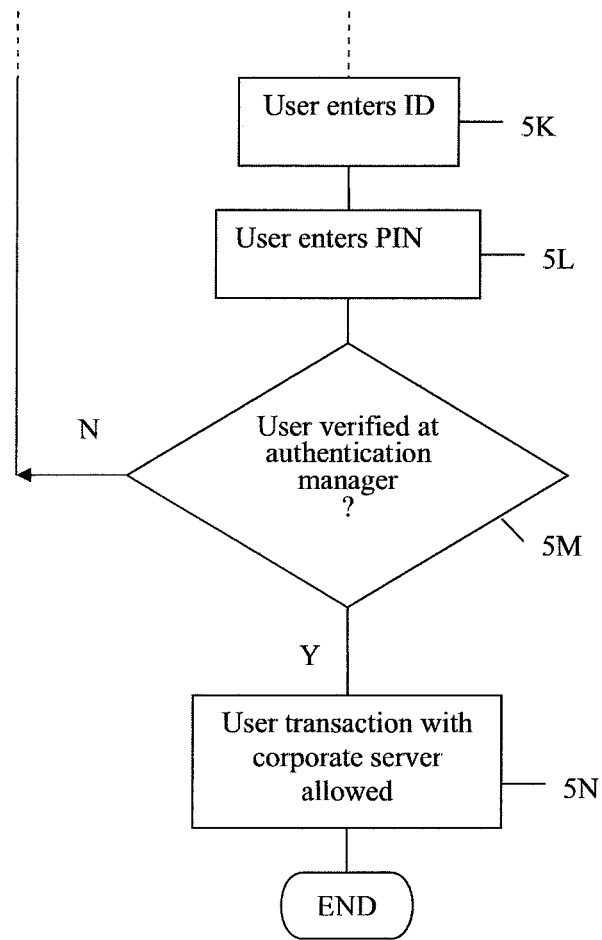

The flow chart of FIG. 5 shows the procedure performed by the transaction manager application 62 running on the mobile device for authenticating a transaction.

At step 5A it is established that the user of the mobile device 1 wishes to perform a transaction. In this example, the transaction is with the corporate network 30, and in particular is a request to retrieve data from the corporate server 50. Such an indication would typically be made by a user interacting with the transaction manager application 62 running on the processor of the UICC 20, through the graphical user interface of the mobile device 1. The transaction manager application 62 will then determine, at step 5B, whether a connection to the network core 22 is available. Such a connection will not be available if, for example, the mobile device 1 is in an area where there is no radio coverage provided by the base stations of the network core 22.

If network coverage is available, then, at step 5C, the "get time" procedure of FIG. 3 is performed. This provides the transaction manager application 62 with UTC clock time value T1 (and other time information). At step 5D the application 62 sends a message including the UTC clock time T1 to the time verification processor 42 of the UICC 20, which message also includes an indication that the time T1 has just been obtained from a network connection with the UTC clock 34. This message is interpreted by the time verification processor 42 and satisfies the time verification processor 42 that the time T1 is current and accurate. The time verification processor 42 will prevent generation of the authentication code if it is not satisfied that the time T1 is current and accurate.

The transaction manager application 62 then issues a request for an authentication code for the transaction to the authentication code calculator 44 on the UICC 20. The authentication code calculator 44 obtains the time T1 from the time verification processor 42 (but this is only provided if the time verification processor 42 is satisfied that the time T1 is current and accurate) and the seed from the seed store 40 of the UICC 20. The authentication code calculator 44 then calculates the authentication code based on the seed in seed store 40 and the time using an authentication algorithm and passes the authentication code to the transaction manager application 62.

If, at step 5B, it is determined that no network connection is available, then, at step 5E, the transaction manager application 62 reads the current NITZ time from the NITZ store 48. This is referred to as time tc.

At step 5F the transaction manager application 62 calculates the period since the UTC time was last received from the UTC clock 34. This period P is the difference between the current NITZ clock time (tc) and the recorded NITZ time T2, recorded at step 3C (T2 being the NITZ time at which the UTC clock 34 was last accessed).

At step 5G it is determined whether the period P exceeds a threshold (that is, it is determined whether the period since the UTC time was last retrieved from the UTC clock 34 is greater than a predetermined time period). If P does exceed the threshold, at step 5H, the transaction is declined by the transaction manager application 62, and the user is informed of this via the graphical user interface of the mobile terminal 1. An explanation of the reason for the transaction being declined may be provided, so that the user knows that there is a possibility of proceeding with the transaction when a network connection becomes available.

On the other hand, if, at step 5G, it is determined that the period P is less than or equal to the threshold, then, at step 5I, the current time Tc is calculated by adding the time offset To (calculated at step 3D) to the NITZ clock time tc obtained at step 5E. Step 5I provides an estimate of the true UTC time. This will be satisfactory if the difference (offset time To) between the true UTC clock time and the NITZ clock time has been calculated recently. If the period P is set to a suitably low value, then it can be assumed that the calculated current time Tc will be fairly close to the true UTC time, and will correspond closely to the current time at the UTC clock 34.

At step 5J the transaction manager application 62 passes a message including the calculated current time Tc to the time verification processor 42 of the UICC 20, which message also includes an indication of the time period P. The time verification processor 42 then verifies that the time period P is sufficiently low for the calculated current time value Tc to be considered to be an accurate approximation of the true UTC time—to satisfy the time verification processor 42 that the time Tc is accurate. The time verification processor 42 will prevent generation of the authentication code if it is not satisfied that the time value Tc is an accurate approximation of the true UTC time.

The transaction manager application 62 then issues a request to the authentication code calculator 44 for an authentication code. The authentication code calculator 44 retrieves the time value Tc from the time verification processor 42 (but this is only provided if the time verification processor 42 is satisfied that the time value Tc is an accurate approximation of the true UTC time) and retrieves the seed from the seed store 40 of the UICC 20. The authentication code is then calculated using the algorithm pre-stored in the authentication calculator 44 and passes the authentication code to the transaction manager application 62.

Step 5K is performed after the authentication code is calculated in step 5D or step 5J. At step 5K the user provides their user ID, and at step 5L, the user provides their PIN. The user ID and PIN are the credentials required for the user to identify themselves to the corporate server 50.

The authentication code calculated at step 5D or 5J, the user ID entered at step 5K and the PIN entered at step 5L are then provided in a transaction request message to the corporate network 30, where they are received by the authentication manager 52. The transaction request message also includes information that allows the transaction to be identified—in this example, a request for particular data from the corporate server 50.

At step 5M the authentication manager 52 identifies the user ID from the received message, and retrieves the PIN associated with that user ID that has previously been stored in the database 54. The authentication manager 52 retrieves the seed corresponding to the user ID from the database 54 and obtains the current time, via the internet 32, from the UTC clock 34. An authentication algorithm on the authentication manager 52, which corresponds to the authentication algorithm on the authentication code calculator 44 of the UICC 20, calculates an authentication code based on the retrieved time (from the UTC clock 34) and the retrieved seed (from the database 54). If the both the PIN and the authentication code calculated by the authentication manager 52 match the PIN and the authentication code received in the transaction request message from the mobile device 1, this proves that the transaction originated from a person that knew the user ID and the PIN of the user, and who also had possession of the UICC 20 at the time the transaction message was created (in order to be able to create the correct authentication code in the transaction request message). If at step 5M it is determined that the PIN or authentication codes do not match, then, at step 5H, the transaction is declined. That the transaction is declined may be indicated to the user via the graphical user interface of the mobile terminal 1, and the reason for the transaction being declined may be indicated.

If, at step 5M, it is determined that the PINs and the authentication codes match, then, at step 5N, a message is passed to the corporate server 50, containing a flag indicating that the user's identity has been authenticated. The corporate network 30 then generates a transaction reply message which includes the information requested from the corporate server 50, and this is provided to the user of mobile device 1.

In the embodiment described above the manner in which the user ID and PIN (provided by the user at steps 5K and 5L), and the authentication code calculated at step 5D or 5J, are provided to the corporate network 30 is not specified. Also, the method by which the transaction reply message, which includes the information requested from the corporate server 50, is provided from the corporate network to the user of the mobile terminal 1 is not specified. The transaction manager message and the transaction reply message may be transmitted by any suitable mechanism.

A convenient mechanism (if available) for transmission of the user ID, PIN, authentication code and/or transaction reply message is the cellular telecommunications network, via the network core 22 and the Internet 32.

If a cellular telecommunications network connection is available then, at step 5J, the transaction manager application 62, via the graphical user interface of the mobile terminal 1, will prompt the user to enter their user ID and will record this. Similarly, at step 5K, the graphical user interface of the mobile terminal 1 will prompt the user to enter their PIN and will store this. The user ID and the PIN, and the authentication code calculated at step 5D or 5J will then be transmitted in the transaction request message from the mobile terminal 1 to the network core 22, and from the network core 22 via the Internet 32 to the corporate network 30, where they are received by the authentication manager 52. After approval of the transaction at step 5M the information requested will be provided to the user of the mobile device in the transaction reply message that is transmitted via the Internet 32 and a network core 22 to the mobile terminal 1.

However, if no network connection is available (in which case the authentication code will be calculated in step 5J), the user ID (obtained at step 5K) and the PIN (obtained at step 5L) must be provided in the transaction request message to the corporate network 30 by another suitable mechanism. For example, the user ID, PIN and authentication code (which may be viewed on the display of the mobile device 1) could be manually entered by the user into a web page displayed on a personal computer (not shown) that is connected to the Internet 32 via a PSTN, ADSL, or other wired or wireless connection. The user ID, PIN and authentication code can then be delivered to the corporate network 30. The transaction reply message generated by the corporate server 30 may be transmitted via the Internet 30 to the personal computer just mentioned used by the user of the mobile device 1 to allow consumption of the information in the transaction reply message on that personal computer.

Figure 6:
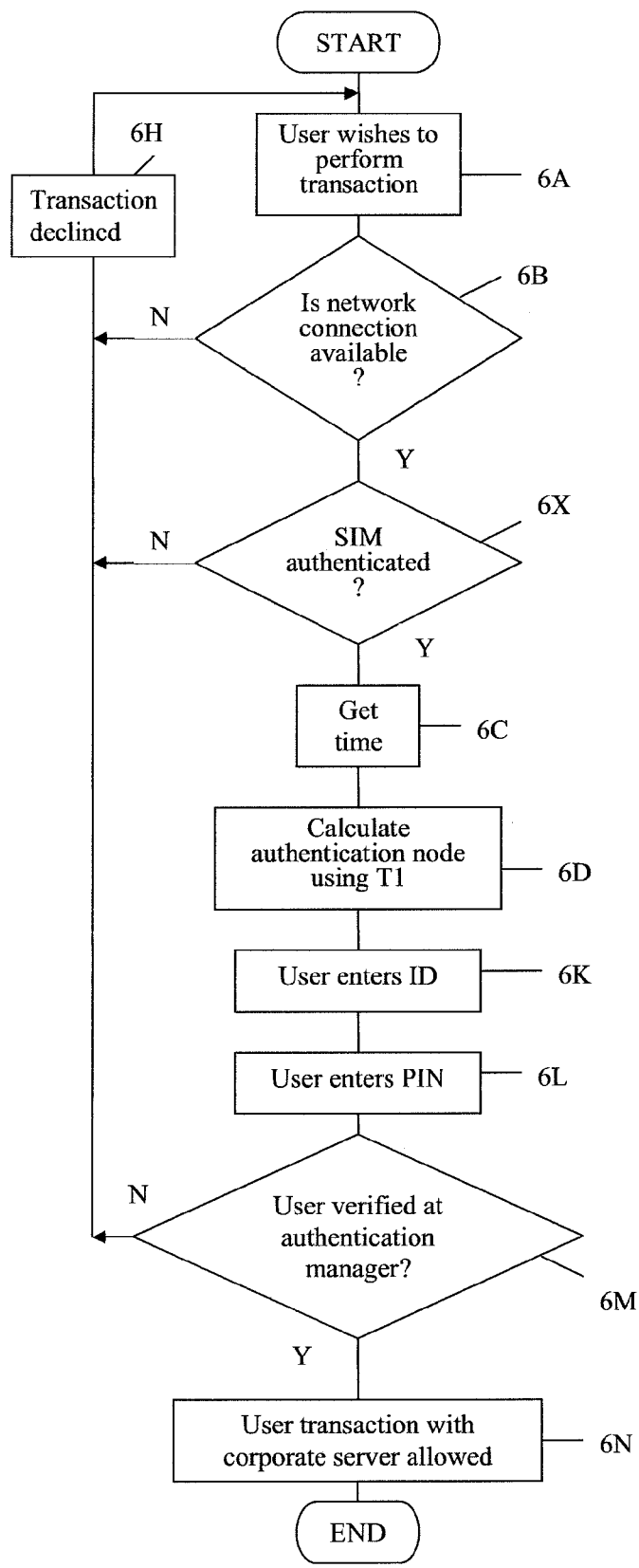
FIG. 6 is a flow chart showing the steps taken in accordance with an alternative arrangement to that shown in FIG. 5 in which security is further enhanced.

FIG. 6 is a flow chart showing an alternative arrangement to that of FIG. 5 in which a transaction is only allowed to be authenticated if the UICC 20 is authenticated with the network core 22 such that the UICC 20 is registered with the network core 22 to allow telecommunications services to be provided to the mobile device 1. The latter authentication is the conventional SIM or USIM authentication performed by mobile terminals operating in accordance with the GSM and UMTS Standards (and other corresponding Standards), and as briefly described above. The procedure may be one where the HLR 10 of the network core 22 sends a challenge to the UICC 20. The UICC 20 then generates a response using an encryption algorithm in the SIM or USIM and a unique key Ki in the SIM or USIM. The response is transmitted back to the core network 22 and is checked against information held by the core network to determine whether the response is as expected.

In FIG. 6 steps which correspond to steps performed in the flow chart of FIG. 5 are referenced with the same letter.

At step 6A it is established that the user of the mobile device 1 wishes to perform a transaction—typically by the user interacting with the transaction manager application 62 running on the processor of the mobile device 1.

The transaction manager 62 then determines at step 6B whether a connection to the network core is available. Such a connection will not be available if, for example, the mobile device is in an area where there is no radio coverage provided by the base stations of the network core 22.

If, at step 6B, it is determined that there is no network connection available, then, at step 6H, the transaction is declined by the transaction manager application 62, and the user is informed of this via the graphical user interface with the mobile terminal 1. An explanation of the reason for the transaction being declined may be provided, so that the user knows that there is a possibility of proceeding with the transaction when a network connection becomes available.

On the other hand, if at step 6B it is determined that network coverage is available, it is then determined at step 6X whether the UICC 20 is authenticated and registered with the network in accordance with a GSM and UMTS Standards (for example) in the conventional manner discussed above. As an additional security measure, even if the UICC 20 is authenticated and registered with the network, the UICC authentication and registration procedure may be repeated at step 6X to confirm the UICC authentication status.

If, at step 6X, it is determined that the UICC 20 is not authenticated (or cannot be re-authenticated), then, at step 6H, the transaction is declined by the transaction manager application 62. Again, the user may be informed by the graphical user interface of the mobile terminal 1 of the reason for the transaction being declined.

On the other hand, if, at step 6X, it is determined that the UICC is authenticated, then, at step 6C, the "get time" procedure of FIG. 3 is performed. This provides the transaction manager application 62 with the UTC clock time value T1 (and other time information). At step 6D the transaction manager application 62 passes the UTC clock time T1 to the time verification processor 42 of the UICC 20, together with an indication that the time T1 has just been obtained from the network connection with the UTC clock 34. This information satisfies the time verification processor that the UTC clock time is current and accurate.

The transaction manager 62 then issues a request for an authentication code for the transaction to the authentication code calculator 44 on the UICC 20. The authentication code calculator 44 obtains the UTC clock time from the time verification processor 42 and obtains the seed from the seed store 40 of the UICC 20. The authentication code calculator 44 then calculates the authentication code using the authentication algorithm and passes the authentication code to the transaction manager application 62.

At step 6K the transaction manager application 62, via the graphical user interface of the mobile terminal 1, prompts the user to enter their user ID. At step 6L the user is prompted to provide their PIN.

The authentication code calculated at step 6D, the user ID entered at step 6K and the PIN entered at step 6L are then transmitted to the network core 22, and from the network core 22 via the Internet 32 to the corporate network 30, where they are received by the authentication manager 52. As before, the transaction request also includes information that allows the transaction to be identified (a request for particular data from the corporate server 50 in this example).

At step 6M the authentication manager 52 identifies the user ID from the received message, and retrieves the PIN associated with that user ID that has been previously stored in the database 54. The PIN is verified in the same manner as in step 5M described above. Also as in step 5M described above, the authentication manager 52 calculates the authentication code and determines whether the calculated authentication code matches the authentication code received in the transaction request message. If, at step 6M, it is determined that the PIN and authentication codes do not match, then, at step 6H, the transaction is declined. That the transaction is declined may be indicated to the user via the graphical user interface of the mobile terminal 1, and the reason for the transaction being declined may be indicated.

If, at step 6M, it is determined that the PINs and the authentication codes match, then, at step 6N, the message is passed to the corporate server 50, together with a flag indicating that the message has been authenticated. The corporate network 30 then generates a transaction reply message which includes the information requested from the corporate server 50, and this is returned to the mobile device 1 via the Internet 32 and the network core 22 over the mobile telecommunications network.

This method provides improved authentication, as the user must be both authenticated with the mobile telecommunications network and authentication manager 52 of the corporate network 30 in order for the transaction to proceed. However, a disadvantage of this arrangement is that authentication can only occur when the mobile device 1 is registered with the core network 22.

In the embodiments described above the time verification processor 42, the time manager application 60 and the transaction manager application 62 are provided on the UICC 20. These relationships are not essential. A time verification processor may be located on the mobile device 1. Additionally or alternatively one or both of the time manager applications 60 and the transaction manager application 62 may be provided on the mobile device 1. Further, any of the time verification processor 42, time manager application 60 and transaction manager application 62 may be split between the UICC 20 and the mobile device 1 (i.e. partially on the UICC 20 and partially on the mobile device 1).

The time verification processor 42, authentication code calculator 44, time manager application 60 and transaction manager application 62 may be installed on the UICC 20/mobile device 1 prior to distribution to the user. Alternatively, any or all of these elements may be wholly or partially installed by over the air transmission from the network core 22.

In the FIG. 5 embodiment (where a network connection is available) and in the FIG. 6 embodiment, a transaction may be authenticated with the user only being required to enter their PIN. The transaction request message may be pre-populated with the user ID. Further, the authentication code calculated by the authentication code calculator 44 may be automatically added to the transaction request message. This advantageously makes it highly convenient for the user of the mobile terminal 1 to perform authenticated transaction using their mobile device 1. In contrast to the prior art, there is no requirement for the user to carrier a separate token and to enter the authentication code displayed by that token.

In the embodiments the mobile device 1 receives and stores the NITZ time, which is provided by the network core 22. The system described herein is also applicable to arrangements where no NITZ time is available from the network core 22 or where the mobile device 1 does not store the NITZ time, in which case the NITZ time is replaced by the time from a clock provided on the mobile device 1. With such an arrangement, the flow chart of FIG. 4 may be amended at step 4D to detect whether the mobile terminal 1 clock has been adjusted e.g. manually by the user. If manual adjustment of the clock has occurred, then step 4B is performed, whereas if manual adjustment of the clock has not occurred, then the procedure returns to step 4A. The clock of mobile terminal 1 may have additional or alternative ways of changing the time, for example based on Internet or company time servers.

In the embodiments described above, the UICC 20 is a physical UICC in the form of a smart card of the type found in conventional cellular telecommunications devices, and containing a SIM and or a USIM as embedded applications. As an alternative to such a form of UICC, the SIM may be a simulation of a cellular telecommunications network SIM or USIM—that is, a software program that performs the same function as a cellular telecommunications network SIM or USIM but which does not have the physical form of a cellular telecommunications network UICC. For example, the simulation of a UICC could be a computer program that is capable of receiving the "challenge" described above from the network core 22 and calculating a suitable "response" of the type mentioned above. The simulated SIM or USIM will also perform the functionality of the seed store 40, verification processor 42 and authentication code calculator 44. The simulated SIM or USIM may, for example, be provided by a laptop computer and will allow the laptop computer to obtain telecommunications services from a cellular telecommunications network.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An apparatus for authenticating a transaction between a user and an entity, the apparatus comprising:
   a cellular telecommunications universal integrated circuit card (UICC) module, the UICC module including at least one processor that executes software stored on a non-transitory computer readable medium and is adapted to generate a time-dependent authentication code which is dependent on a time value and which is usable to authenticate the transaction only during a predetermined threshold time period, wherein the UICC module is operable to be registered with the cellular telecommunications network for which the user has a mobile telecommunications device and includes information which is usable to authenticate the user's mobile telecommunications device with the cellular telecommunications network to obtain telecommunications services therefrom;

a time obtaining device that obtains, via the cellular telecommunications network, a current time from a time source that is independent of a local clock of the mobile telecommunications device; and a time value verifying device that:
   compares the obtained current time from the time source with a current clock time from the local clock of the mobile telecommunications device, the current clock time being accessible by the apparatus without using the cellular telecommunications network;
   calculates an offset value indicative of the difference between the obtained current time from the time source and the current clock time from the local clock of the mobile telecommunications device;
   calculates a period, being a calculated period, wherein the calculated period is a difference between the current clock time and a clock time recorded when the current time was last obtained from the time source;
   uses the offset value to calculate the time value to enable generation of the time-dependent authentication code when a connection to the cellular telecommunications network is not available, wherein the time-dependent authentication code is usable to authenticate the transaction only when the calculated period is within the predetermined threshold time period, and wherein the predetermined threshold time period begins at a point when the current time was last obtained from the time source via the cellular telecommunications network.

2. The apparatus of claim 1, wherein the UICC module is operable to receive a challenge message from the cellular telecommunications network and for generating a corresponding response message for transmitting to the cellular telecommunications network for authenticating the user's mobile telecommunications device with the cellular telecommunications network.

3. The apparatus of claim 1, wherein the UICC module is operable to only generate the time-dependent authentication code when the UICC module is registered with the cellular telecommunications network.

4. The apparatus of claim 1, wherein the time obtaining device includes a device operable to cause generation of a message for requesting the current time value from the time source.

5. The apparatus of claim 4, wherein the message is at least one of: a USSD message, an SMS message, or is a message sent in a packet switched or circuit switched communication session with the cellular telecommunications network.

6. The apparatus of claim 1, further comprising:
a device that receives a key value and for storing the key value on the UICC module, the UICC module being operable to generate the time-dependent authentication code in dependence upon the key value and the time value.

7. The apparatus of claim 1, wherein the current time is obtained from the time source via the cellular telecommunications network but is not a network time maintained by the cellular telecommunications network.

8. A method of authenticating a transaction between a user and an entity, the method comprising:
   operating a modified cellular telecommunications network universal integrated circuit card (UICC) module, the UICC module including at least one processor that executes software stored on a non-transitory computer readable medium and being operated to generate a time-dependent authentication code which is dependent on a time value and which is usable to authenticate the transaction only during a predetermined threshold time period, wherein the UICC module is operable to be registered with the cellular telecommunications network for which the user has a mobile telecommunications device and includes information which is usable to authenticate the user's mobile telecommunications device with the cellular telecommunications network to obtain telecommunications services therefrom;
   obtaining, via the cellular telecommunications network, a current time from a time source that is independent of a local clock of the mobile telecommunications device;
   comparing the obtained current time with a current clock time from the local clock, the current clock time being accessible without using the cellular telecommunications network;
   calculating an offset value indicative of the difference between the obtained current time from the time source and the current clock time from the local clock of the mobile telecommunications device;
   calculating a period, being a calculated period, wherein the calculated period is a difference between the current clock time and a clock time recorded when the current time was last obtained from the time source; and
   using the offset value to calculate the time value to enable generation of the time-dependent authentication code when a connection to the cellular telecommunications network is not available, wherein the time-dependent authentication code is usable to authenticate the transaction only when the calculated period is within the predetermined threshold time period, and wherein the predetermined threshold time period begins at a point when the current time was last obtained from the time source via the cellular telecommunications network.

9. The method of claim 8, wherein the UICC module receives a challenge message from the cellular telecommunications network and generates a corresponding response message for transmitting to the cellular telecommunications network to authenticate the user's mobile telecommunications device with the cellular telecommunications network.

10. The method of claim 8, wherein the UICC module only generates the time-dependent authentication code when the UICC module is registered with the cellular telecommunications network.

11. The method of claim 8, wherein the time obtaining step includes causing generation of a message for requesting the current time value from the time source.

12. The method of claim 11, wherein the message is at least one of: a USSD message, an SMS message, or is a message sent in a packet switched or circuit switched communication session with the cellular telecommunications network.

13. The method of claim 8, further comprising:
receiving a key value and storing the key value on the UICC module, the UICC module generating the time-dependent authentication code in dependence upon the key value and the time value.

14. The method of claim 8, wherein the current time is obtained from the time source via the cellular telecommunications network but is not a network time maintained by the cellular telecommunications network.

15. A non-transitory computer readable medium storing software for authenticating a transaction between a user and an entity, the software comprising:
   executable code that operates a modified cellular telecommunications network universal integrated circuit card (UICC) module to generate a time-dependent authentication code which is dependent on a time value and which is usable to authenticate the transaction only during a predetermined time period, wherein the UICC module is operable to be registered with the cellular telecommunications network for which the user has a mobile telecommunications device and includes information which is usable to authenticate the user's mobile telecommunications device with the cellular telecommunications network to obtain telecommunications services therefrom;

executable code that obtains, via the cellular telecommunications network, a current time from a time source that is independent of a local clock of the mobile telecommunications device;

executable code that compares the obtained current time from the time source with a current clock time from the local clock, the current clock time being accessible without using the cellular telecommunications network;

executable code that calculates an offset value indicative of the difference between the obtained current time from the time source and the current clock time from the local clock;

executable code that calculates a period, being a calculated period, wherein the calculated period is a difference between the current clock time and a clock time recorded when the current time was last obtained from the time source; and executable code that uses the offset value to calculate the time value to enable generation of the time-dependent authentication code when a connection to the cellular telecommunications network is not available, wherein the time-dependent authentication code is usable to authenticate the transaction only when the calculated period is within the predetermined threshold time period, and wherein the predetermined threshold time period begins at a point when the current time was last obtained from the time source via the cellular telecommunications network.

16. The non-transitory computer readable medium of claim 15, wherein the UICC module receives a challenge message from the cellular telecommunications network and generates a corresponding response message for transmitting to the cellular telecommunications network to authenticate the user's mobile telecommunications device with the cellular telecommunications network.

17. The non-transitory computer readable medium of claim 15, wherein the UICC module only generates the time-dependent authentication code when the UICC module is registered with the cellular telecommunications network.

18. The non-transitory computer readable medium of 15, wherein the executable code that obtains the current time includes executable code that causes generation of a message for requesting the current time value from the time source.

19. The non-transitory computer readable medium of claim 18, wherein the message is at least one of: a USSD message, an SMS message, or is a message sent in a packet switched or circuit switched communication session with the cellular telecommunications network.

20. The non-transitory computer readable medium of The method of claim 15, further comprising:
executable code that receives a key value and stores the key value on the UICC module, the UICC module generating the time-dependent authentication code in dependence upon the key value and the time value.

21. The non-transitory computer readable medium of claim 15, wherein the current time is obtained from the time source via the cellular telecommunications network but is not a network time maintained by the cellular telecommunications network.

* * * * *